US005905886A

United States Patent [19]
Uegaki et al.

[11] Patent Number: 5,905,886
[45] Date of Patent: May 18, 1999

[54] EMULATOR HAVING SINGLE PORT MEMORIES FOR SIMULTANEOUS RECORDING AND READING OF MEASUREMENT DATA

[75] Inventors: Akihiro Uegaki; Tadayuki Akatsuki, both of Hyogo, Japan

[73] Assignees: Mitsubishi Electric Semiconductor Software Co., Ltd., Hyogo; Mitsubishi Denki Kabushiki Kaisha, Tokyo, both of Japan

[21] Appl. No.: 08/987,136

[22] Filed: Dec. 8, 1997

[30] Foreign Application Priority Data

Jul. 18, 1997 [JP] Japan .................................. 9-194525

[51] Int. Cl.⁶ ..................................................... G06F 13/00
[52] U.S. Cl. .......................... 395/500; 364/578; 364/488; 395/200.43; 395/200.44; 395/184.01
[58] Field of Search ..................................... 364/188, 200, 364/230, 578; 365/230.05; 395/230.05, 500, 800.35; 382/56; 711/154

[56] References Cited

U.S. PATENT DOCUMENTS 5,528,522  6/1996  Delguercio .
5,669,009  9/1997  Buktenica et al. .................. 395/800.35
5,754,827  5/1998  Barbier et al. ........................... 395/500

FOREIGN PATENT DOCUMENTS 1217524  8/1989  Japan .

*Primary Examiner*—Kevin J. Teska
*Assistant Examiner*—Lonnie A. Knox
*Attorney, Agent, or Firm*—Leydig, Voit & Mayer

[57] ABSTRACT

An emulator controls two single port memories by switching to exclusively connect the single port memories to a target microcomputer and a control microcomputer.

6 Claims, 1 Drawing Sheet

EMULATOR HAVING SINGLE PORT MEMORIES FOR SIMULTANEOUS RECORDING AND READING OF MEASUREMENT DATA

BACKGROUND OF THE INVENTION

1. Field of the Invention

The present invention relates to an emulator, and particularly to an emulator having a real-time RAM monitor function. The term real-time RAM monitor function is a function for monitoring data stored in a memory (RAM), corresponding to respective addresses accessed by a microcomputer, a distinction between a read and write operations and the presence or absence of the read or write operation after the initiation of an emulating operation of the microcomputer without influencing on the speed of execution of a program upon emulating the microcomputer.

2. Description of the Prior Art

FIG. 2 is a block diagram showing a circuit configuration for implementing a real-time RAM monitor function of a conventional emulator. In the drawing, reference numeral 1 indicates a target microcomputer whose operation is emulated. Reference numeral 7 indicates a dual-port memory (corresponding to a memory having two pairs of buses used for an address signal, data and a control signal and a configuration accessible from the two pairs of buses respectively) for storing therein data indicative of data stored in a memory, a distinction between read and write operations of the target microcomputer and the presence or absence of the read or write operation thereof from the initiation of an emulating operation thereof. Reference numeral 2 indicates a write control circuit for controlling the writing of data into the dual-port memory 7. The write control circuit 2 is activated based on a control signal outputted from the target microcomputer 1 and a write operation inhibit signal outputted from a control microcomputer 5.

Reference numeral 8 indicates an address bus electrically connected to an address bus of the target microcomputer 1. Reference numeral 9 indicates a data bus electrically connected to a data bus of the target microcomputer 1. Reference numeral 10 indicates a control bus electrically connected to a control bus of the target microcomputer 1. The respective buses are electrically connected to their corresponding buses of the target microcomputer 1 and a customer system (not shown) with the target microcomputer 1 such as a rice boiler mounted thereon.

Reference numeral 11 indicates a signal line for transmitting a write control signal for controlling the writing of the data into the dual-port memory 7 from the write control circuit 2. Reference numeral 5 indicates a control microcomputer for reading measurement data stored in the dual-port memory 7. The stored measurement data may include data read or written by the target microcomputer, data indicative of whether the target microcomputer performed a read or a write operation, and data indicative of the presence or absence of read or write operations performed by the target microcomputer. The dual-port memory 7 is a memory provided to implement the real-time RAM monitor function. States of data on the data bus 9 and a control signal on the control bus 10 are written into the dual-port memory 7 under the control of the write control circuit 2. The write control circuit 2 and the dual-port memory 7 are electrically connected to the address bus 8, data bus 9 and control bus 10 so that a program developer may be unconscious of program coding and to avoid the influence exerted on the speed for the execution of a program by the target microcomputer 1.

The operation will next be described.

When the target microcomputer 1 is emulated, the write control circuit 2 generates a write control signal for the dual-port memory 7 from an address signal on the address bus 8 and the control signal on the control bus 10. Next, if the address signal on the address bus 8 indicates an address to be measured for the dual-port memory 7, then the write control circuit 2 outputs a write control signal to the signal line 11 to write the states of the data on the data bus 9 and the control signal on the control bus 10 into the dual-port memory 7 during write and read cycles of the target microcomputer 1. Thus, the data indicative of the result of measurements, which has been written into the dual-port memory 7, is read by the control microcomputer 5, using another port of the dual-port memory 7.

Owing to such an operational property, as the dual-port memory 7, a memory capable of performing only the write operation on the side thereof connected to the target microcomputer 1 and performing the read and write operations on the side thereof connected to another control microcomputer 5 is used in addition to a memory capable of performing the read and write operations from both ports thereof (the write operation on the control microcomputer 5 side is required upon initialization of the dual-port memory 7). As a modification of FIG. 2, a conventional example is known which adopts a configuration (cycle steal configuration) wherein the dual-port memory 7 is used as a normal single port memory and the result of measurements recorded in the single port memory is read out during a cycle in which the writing of data into the single port memory is not produced.

Since the real-time RAM monitor function of the conventional emulator is constructed as described above, a mass storage and high-speed memory is required to implement the real-time RAM monitor function with an increase in memory size of a microcomputer intended for development and evaluation of a program and the speeding up of a memory access operation of the microcomputer. However, since the high-speed dual port memory is small in capacity and high in cost as compared with the single port memory having the same access time as the high-speed dual port memory, it becomes hard to implement the real-time RAM monitor function. Since the achievement of high performance of the microcomputer as well as the adoption of a pipeline structure has increased the frequency of utilization of buses by the microcomputer, a problem arose in that the cycle steal configuration using the single port memory became also hard to realize the real-time RAM monitor function. This invention relates to an emulator.

SUMMARY OF THE INVENTION

With the foregoing in view, it is therefore an object of the present invention to provide an emulator having a real-time RAM monitor function, which is capable of utilizing single port memories each low in cost, fast in speed and large in capacity and emulating a microcomputer large in memory size and having very fast access operations to each memory.

According to a first aspect of this invention, for achieving the above object, there is provided an emulator comprising a second memory provided outside a target microcomputer, which is composed of at least two pairs of single port memories respectively having the same addresses as those in a first memory accessed by the target microcomputer upon its normal operation, and switches for individually interrupting the two pairs of single port memories from the target microcomputer. Thus, an advantageous effect can be brought about in that a real-time RAM monitor function capable of emulating a microcomputer large in memory size and having very fast access operations to each memory can be achieved at low cost.

According to a second aspect of this invention, there is provided an emulator capable of further causing a second memory to further store information indicative of the distinction between read and write operations of a target microcomputer and whether or not the target microcomputer has performed the read or write operation after the initiation of an emulating operation thereof. Thus, an advantageous effect can be brought about in that the operation of the target microcomputer can be emulated faithfully.

According to a third aspect of this invention, there is provided an emulator further including a third memory capable of storing therein data stored in two pairs of single port memories. Thus, an advantageous effect can be brought about in that the data stored in the two pairs of single port memories can be reproduced without a miss.

BRIEF DESCRIPTION OF THE DRAWINGS

Other objects and advantages of the present invention will be more completely understood from the following detailed description, taken in conjunction with the accompanying drawings wherein.

DETAILED DESCRIPTION OF THE PREFERRED EMBODIMENTS

A preferred embodiment of the present invention will hereinafter be described in detail with reference to the accompanying drawings.

Figure 1:
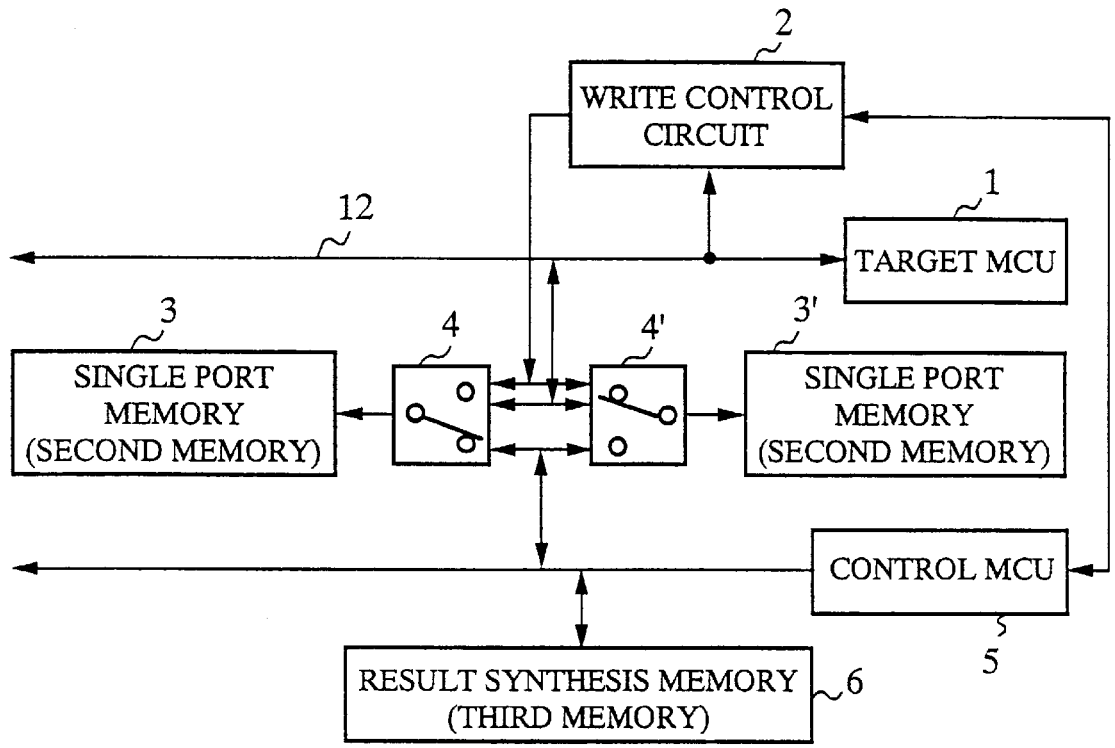
FIG. 1 is a block diagram showing a circuit configuration for implementing a real-time RAM monitor function of an emulator according to one embodiment of the present invention.
Figure 2:
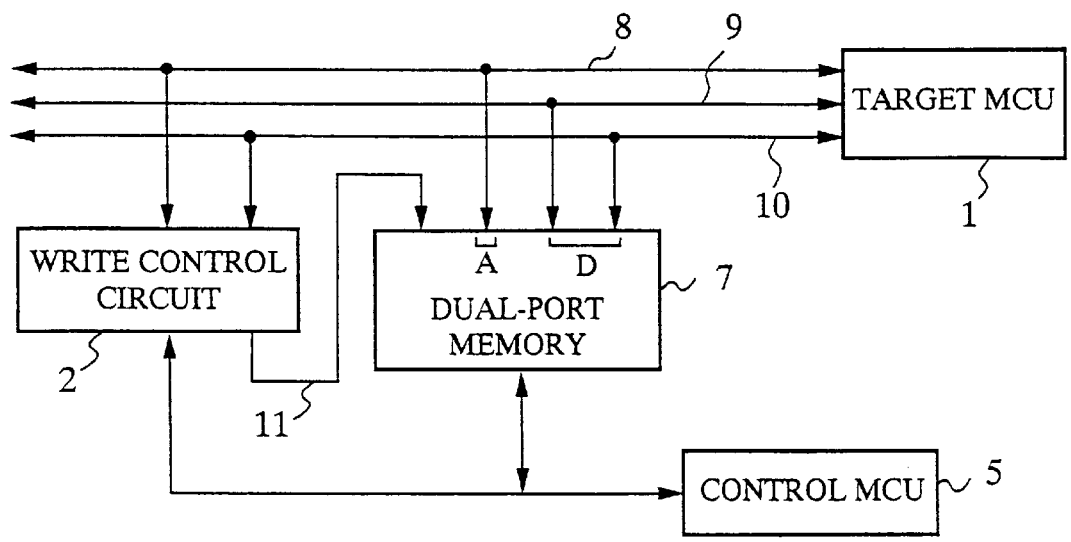
FIG. 2 is a block diagram illustrating a circuit configuration for implementing a real-time RAM monitor function of a conventional emulator.

FIG. 1 is a block diagram showing a circuit configuration for carrying out a real-time RAM monitor function of an emulator according to one embodiment of the present invention. In the drawing, reference numeral 1 indicates a target microcomputer to be emulated. Reference numerals 3 and 3' indicate single port memories (second memory) respectively having the same addresses as a memory accessed by the target microcomputer 1 during normal operation of the target microcomputer and storing data to be written and read when the target microcomputer 1 writes the data into the memory and reads it therefrom, information indicative of the distinction between read and write operations of the target microcomputer 1, and information indicative of whether the target microcomputer 1 has performed the read or write operation after the initiation of an emulate or emulating operation by the target microcomputer 1. Reference numerals 4 and 4' respectively indicate switches for individually connecting and disconnection the single port memories 3 and 3' to and from buses 12 electrically connected to their corresponding buses for the target microcomputer 1. A control microcomputer 5 controls the switching between the switches 4 and 4'.

Reference numeral 6 indicates a result synthesis memory (third memory) for storing the data stored in the single port memories 3 and 3'. Reference numeral 5 indicates the control microcomputer for reading the read or written data, and data indicative of the distinction between the read and write operations and the presence or absence of the read or write operation, which corresponds to the result of measurements for the target microcomputer 1, which has been written into each of the single port memories 3 and 3'. Reference numeral 2 indicates a write control circuit for controlling the writing of data into the single port memories 3 and 3'. The write control circuit 2 decodes an address signal and a control signal on the buses 12 electrically connected to their corresponding buses for the target microcomputer 1 to generate a signal to be written to each of the single port memories 3 and 3', and operates based on a write operation inhibit signal supplied from the control microcomputer 5. Reference numeral 12 indicates the address bus, data bus and control bus electrically connected to their corresponding address, data and control buses of the target microcomputer 1. The respective buses are electrically connected to corresponding buses of the target microcomputer 1 and a customer system (not shown) with the target microcomputer 1 such as a rice boiler mounted thereon.

The single port memories 3 and 3' respectively have (1) a region (8 bit) for storing data accessed by the target microcomputer 1, (2) a region (one bit) for storing a read flag indicative of the result of a read access, and (3) a region (one bit) for storing a write flag indicative of the result of a write access, in respective address spaces. The single port memories 3 and 3' are memories provided to implement the real-time RAM monitor function. The accessed data, read flag and write flag are written into their corresponding regions of each of the single port memories 3 and 3' based on a control signal generated from the write control circuit 2. The single port memories 3 and 3' and the write control circuit 2 are electrically connected to the buses 12 so that a program developer can be unconscious of program coding. Further, the single port memories 3 and 3' and the write control circuit 2 are designed so that they can be alternately switched and thereby connected to the buses 12 by the switches 4 and 4' to avoid the influence exerted on the speed for the execution of a program by the target microcomputer 1 without being subjected to waiting and holding upon execution of the program by the target microcomputer 1.

The switches 4 and 4' select the write signal generated from the write control circuit 2. The single port memory 3 or 3' selected by the switches 4 or 4' is capable of being subjected to the read and write operations of the control microcomputer 5. The result synthesis memory 6 is capable of being always subjected to the read and write operations of the control microcomputer 5 and storing the accessed data, read flag and write flag stored in both the single port memories 3 and 3'. If the address signal on the buses 12 indicates an address to be measured for each of the single port memories 3 and 3', then the write control circuit 2 outputs a write control signal for writing the states of data and a control signal on the buses 12 to either one of the single port memories 3 and 3' upon write and read cycles of the target microcomputer 1.

The operation of the present embodiment will now be described.

The write control circuit 2 first writes the accessed data, read flag and write flag corresponding to access information about the target microcomputer 1 into the single port memory 3 or 3' selected by the switches 4 or 4'. Described specifically, the write control circuit 2 writes the data on the buses 12 to the corresponding address of the selected single port memory 3 or 3'. When the target microcomputer 1 has performed the read access, it sets the read flag at the corresponding address of the selected single port memory 3 or 3' and clears the write flag. When the target microcomputer 1 has performed the write access, it sets the write flag and clears the read flag. When the target microcomputer 1 is executing a user program intended for debug evaluation upon the emulating operation, the switches 4 and 4' are controlled by the control microcomputer 5 so that they are oppositely connected (i.e., either one of the single port memories 3 and 3' is electrically connected to the target microcomputer 1 and the other single port memory is electrically connected to the control microcomputer 5).

The control microcomputer 5 periodically performs the following operation. A description will first be made of a case in which the single port memory 3 is electrically connected to the control microcomputer 5. (1) The control microcomputer 5 clears the read and write flags of the single port memory 3. The control microcomputer 5 reverses the setting of the switches 4 and 4'. (2) The read and write flags of the newly-connected single port memory 3' (which has made measurements on the target microcomputer 1 until the control microcomputer 5 reverses the setting of the switches 4 and 4') are copied onto the result synthesis memory 6. The data of the single port memory 3' at the address to which either the read flag or the write flag is being set, is copied onto the result synthesis memory 6.

The control microcomputer 5 is capable of realizing the real-time RAM monitor function by periodically repeating the above operation. Further, the control microcomputer 5 displays information outputted from the result synthesis memory 6 on an unillustrated monitor or transmits it to the monitor as the result of emulation based on the real-time RAM monitor function.

According to the present embodiment, as has been described above, an advantageous effect can be brought about in that a real-time RAM monitor function of a high-speed microcomputer can be implemented using the single port memories 3 and 3' low in cost and large in capacity without depending on a cycle steal system.

While the preferred embodiment of the present invention has been described above, the description of these is illustrative ones. It should be understood that modifications and changes from these description can be made without departing from the spirit and scope of the following claims.

What is claimed is:

1. An emulator comprising:

a target microcomputer whose operation is emulated, the target microcomputer accessing a first memory during normal operation of the target microcomputer;

a second memory for, when the target microcomputer writes data into the first memory during normal operation of the target microcomputer and reads data from the first memory, storing at least the data to be written into and read from the first memory as measurement data, the second memory comprising at least first and second single port memories, the first and second single port memories each having addresses corresponding to addresses of the first memory, the first and second single port memories storing the measurement data;

at least first and second switches for individually and alternatingly connecting and disconnecting the first and second single port memories to and from the target microcomputer; and a control microcomputer for controlling the first and second switches and reading the measurement data from the first and second single port memories, wherein, during a first time period, the control microcomputer controls the first switch to connect the first single port memory to the target microcomputer for storing measurement data during the first time period, and, during a second time period, the control microcomputer controls the first switch to connect the first single port memory to the control microcomputer for reading the measurement data stored in the first single port memory during the first time period, and controls the second switch to connect the second single port memory to the target microcomputer for storing measurement data during the second time period.

2. The emulator according to claim 1, comprising a third memory for storing data stored in the two single port memories.

3. The emulator according to claim 1, wherein the second memory stores information indicative of a distinction between a read operation and a write operation of the target microcomputer and information indicative of whether the target microcomputer has performed at least one of a read and a write operation after initiation of an emulating operation of the target microcomputer.

4. The emulator according to claim 3, comprising a third memory for storing data stored in the first and second single port memories.

5. An emulator comprising:

a target microcomputer whose operation is emulated, the target microcomputer accessing a first memory during normal operation of the target microcomputer;

a second memory for, when the target microcomputer writes data into the first memory during normal operation of the target microcomputer and reads data from the first memory, storing at least data to be written into and read from the first memory as measurement data, the second memory comprising first and second single port memories, the first and second single port memories each having addresses corresponding to addresses of the first memory, the first and second single port memories storing the measurement data;

first and second switches for individually and alternatingly connecting the target microcomputer to and disconnecting the target microcomputer from the first and second single port memories; and a control microcomputer for controlling the first and second switches and reading measurement data from the first and second single port memories without utilizing a cycle steal technique.

6. The microcomputer of claim 5, wherein during a first time period, the control microcomputer controls the first switch to connect the first single port memory to the target microcomputer for storing measurement data during the first time period and, during the second time period, the control microcomputer controls the first switch to connect the first single port memory to the control microcomputer for reading the measurement data stored in the first single port memory during the first time period, and controls the second switch to connect the second single port memory to the target microcomputer for storing measurement data during the second time period.

\* \* \* \* \*